3,534,200
TORCH FOR WORKING WITH AN ELECTRIC ARC
Alois Wagenleitner, Nyon, Switzerland, and Heinz Liebisch, Geneva, Switzerland, assignors to Societe Anonyme des Ateliers de Secheron, Geneva, Switzerland
Filed Sept. 12, 1968, Ser. No. 759,426
Claims priority, application Switzerland, Sept. 27, 1967, 13,501/67
Int. Cl. B23k 9/16, 9/24, 35/38
U.S. Cl. 219—75                     6 Claims

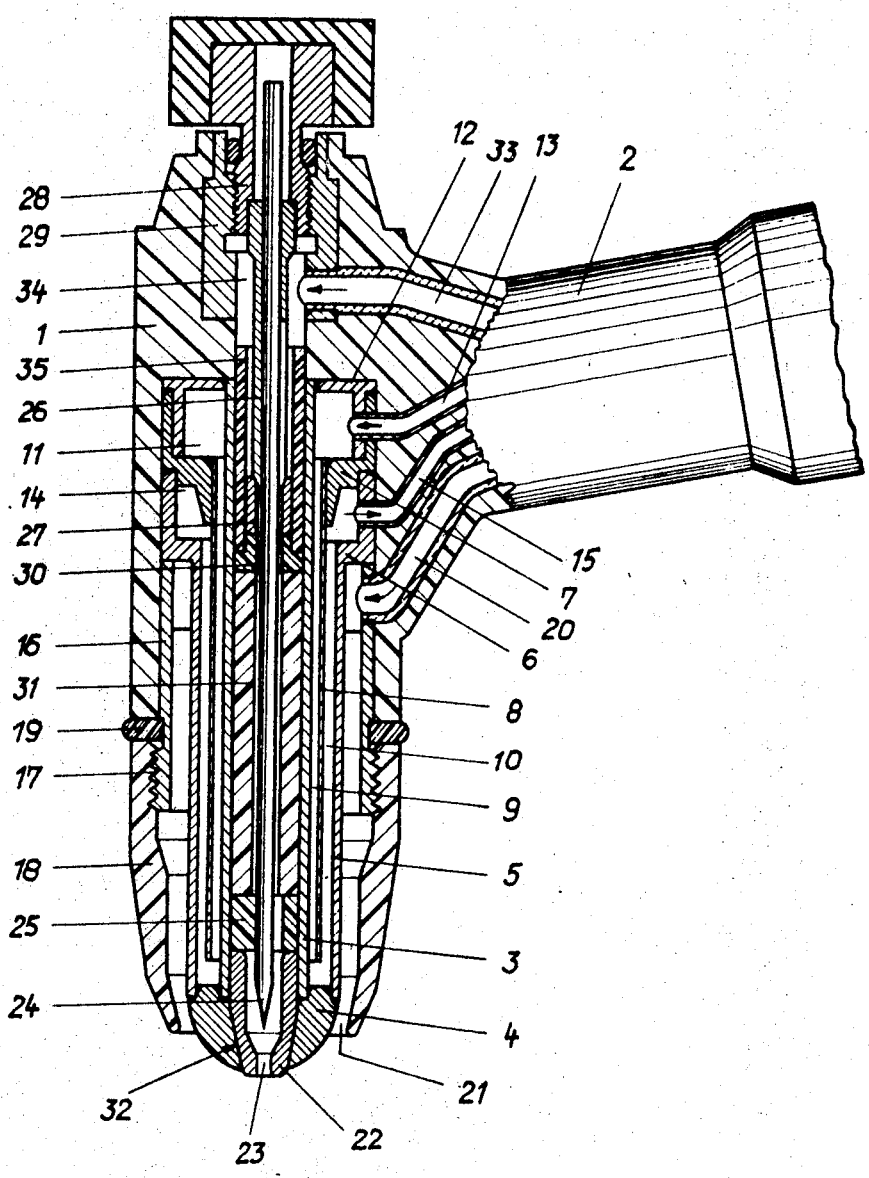

ABSTRACT OF THE DISCLOSURE

The invention relates to a torch for working with an electric arc wherein the walls of the water cooling chamber are formed by parts assembled in permanent fashion and forming a body having an axial channel surrounded by the said chamber, the nozzle is disposed within this channel, which can be opened at its rear end for the introduction of the nozzle within it and for its extraction, and the nozzle cooperates at the front end with stop means belonging to the said body.

---

Torches for working with a constricted electric arc, comprising an electrode of refractory material (non-consumable) provided with a water cooling chamber and an interchangeable nozzle are already known. The interchangeability of the nozzle is necessary, on the one hand, because of its rapid wear and, on the other hand in order to be able to adapt the torch to different working conditions (intensity of the current in the arc).

When working with current intensities in the arc which are relatively important (for instance over about 15 amps), it is necessary to cause the cooling fluid to arrive very near to the part of the nozzle which is most heated by the arc, which makes the removable attachment of this nozzle very difficult. Up to now, in these cases, the method of attaching the nozzle was such that to enable the nozzle to be changed, it was necessary to take apart the various parts forming the walls of the water cooling chamber. This is a serious drawback, owing to the fact that the hydraulic circuit is affected (the liquid leaks out) and to the fact that gaskets must be provided between the various parts forming the walls of the said chamber. In addition, the fluid feeding ducts are situated adjacent the outlet of the nozzle, which in numerous cases causes an impediment from a practical point of view (too much bulk).

The present invention aims at eliminating these defects, by avoiding entirely any interference with the hydraulic circuit when the nozzle is changed. It concerns a torch for working with a constricted electric arc (for instance for welding, cutting, metallizing and spraying) provided with an electrode of refractory material (non consumable), of the type comprising a water cooling chamber and an interchangeable nozzle.

In the torch according to the invention the walls of the water cooling chamber are formed by parts assembled in permanent fashion and forming a body having an axial channel surrounded by the said chamber, the nozzle is disposed within this channel, which can be opened at its rear end for the introduction of the nozzle within it and for its extraction, and the nozzle cooperates at the front end with stop means belonging to the said body.

The single figure of the accompanying drawing illustrates, by way of an example, in axial cross-section, an embodiment of the torch according to the invention.

The body of the torch is visible in 1. It is made of insulating material and comprises a handle 2. This body of the torch is provided with an interior axial recess in which is placed a cooling device constituted as follows: an interior metallic tube 3 the lower end of which is welded to a part 4 constituting, as will be seen, a support for the nozzle. To this part is also welded the lower end of another metallic tube 5 having a larger diameter. The tube 5 flares out at its upper end 6 which is welded to another part 7 welded in its turn to the upper end of an intermediate tube 8 disposed within the space comprised between the tubes 3 and 5. The lower end of the intermediate tube 8 stops short at a certain distance from the part 4. Thus an annular passage exists in 9 between the tubes 3 and 8 and another annular passage exists in 10 between the tubes 8 and 5. These two annular passages communicate with one another at their lower end adjacent the part 4. At its upper end the passage 9 opens into an annular chamber 11 formed on the one hand by the tube 3 and on the other, by the part 7 and an annular part 12 welded to this part 7. It may thus be seen that the different parts 3, 4, 5, 6, 7, 8 and 12 form an integral whole owing to their permanent assembly by welding.

A duct 13 formed inside the handle 2 serves to bring a cooling fluid such as water into the chamber 11. Another duct 15 formed inside the handle 2 and serving as outlet for the cooling fluid opens in an annular chamber 14 formed between the parts 6 and 7. The fluid arriving in 11 flows longitudinally along the annular passage 9, and then, at the lower end of the part 8 returns through the annular passage 10 to escape in 15. It is obvious that the circulation of the cooling fluid could be effected in the reverse direction.

A metallic tube 16, concentric with the tube 5 and arranged outside the latter but at a certain distance is also arranged within the body 1. This tube 16 is provided at its lower end with a screw thread 17 allowing the screwing on of a cap 18, which in this embodiment is made of insulating material, with the interposition of a gasket 19. A duct 20 constituted for instance by a copper tube, arranged within the handle 2 communicates with the space comprised between the tubes 5 and 16. A protecting gas or a mixture of protecting gasses arrives through this duct 20. This gas or mixture of gasses flows through the annular space comprised between the tubes 5 and 16 and flows out in 21 around the nozzle support 4, so as to surround the arc and the molten bath on the work piece and prevent them from coming into contact with the surrounding air.

In 22 may be seen a nozzle through the hole 23 of which the arc, constricted by its passage through this hole, is established between an electrode 24 and the work piece, which is not shown. This electrode is of the type called refractory, that is non consumable. It is in the shape of a metallic rod guided in its lower region by a part made of ceramic material 25 and secured in its upper region by a resilient clamp 26 pressed against a conical seating of a part 27. This clamp is pressed by a screw 28 with an insulating head screwed in a nut 29 integral with the body 1. The part 27, which is metallic, is in its turn pressed against a ring 30 made of insulating material which rests on a cylinder 31 of ceramic material loosely surrounding the electrode 24. It is clear that when the screw 28 is unscrewed, the resilient clamp 26 is loosened, which enables the electrode 24 to be positioned exactly inside the nozzle 22. When this correct positioning has been effected, the electrode is firmly immobilized by simply screwing in the screw 28.

It will be remarked that the tightening of the screw 28 not only ensures the immobilization of the electrode as has just been described, but at the same time the holding in place of the nozzle 22 in the nozzle support 4. This arrangement ensures an intimate contact between the nozzle 22 and the nozzle support 4, thus guaranteeing good thermal transmission between these two parts and, consequently a rapid evacuation of the heat from the nozzle. This results from the fact that the part 25 rests on the upper end of the nozzle and that the latter is provided in 32 with a frusto-conical part which rests on a corresponding conical seating of the support 4.

When it is required to replace the nozzle 22 either because it has become worn or defective, the described torch enables this operation to be carried out very rapidly without the cooling chamber 9, 10 being affected in any way. It is in fact only necessary to unscrew the screw 28 to free the passage toward the rear entirely for the clamp 26, the parts 27, 30, 31, 25 as well as the electrode and the nozzle 22. These various components having been extracted from the body of the torch from behind, that is through the upper part in the figure, it is only necessary to introduce a new nozzle and then to secure it in place by reinserting the parts 25, 31, 30, 27 as well as the clamp 26 with the electrode 24, after which the assembly is immobilized by screwing in the screw 28 with the insulating head.

In 33 one may see another duct arrangement inside the handle 2 and which opens into an annular chamber 34 surrounding the upper part of the clamp 26. The clamp 26 being split and an appreciable clearance existing between the electrode on the one hand and the parts 27, 30 and 31 on the other, a communication thus exists between the chamber 34 and the interior of the nozzle 22. The duct 33 serves to introduce a gas, for instance Argon, destined to form the plasma, that is the arc. This gas arrives in the chamber 34 and from there flows to the outlet 23 of the nozzle, filling the interior of the latter. The electrode and the parts galvanically connected to the latter are insulated in relation to the nozzle as well as to the components galvanically connected to this nozzle. These two assemblies of parts being at different voltages are insulated by means of the following insulating parts: body 1 of the torch, insulating sleeve 35, part 30, tube 31 and centering piece 25. The current or the pilot arc as well as that of the transferred arc arrives through a single lead: the tube 33 serving simultaneously for the introduction of the plasma gas. The return current of the pilot arc springing between the electrode and the nozzle 22 may be made to flow through the conductors 13 or 15 which simultaneously ensure the flow of the cooling fluid. The transferred arc springs betwen the electrode and the work piece and the corresponding circuit is completed by a lead connecting the work piece to the current source. It is needless to say that the voltage of the work piece is different from the voltage of the electrode and from that of the nozzle 22, but the voltage of the nozzle may however be common to the two circuits of the pilot arc and of the transferred arc.

What is claimed is:

1. A torch for working with a constricted electric arc comprising an electrode of refractory material; an interchangeable nozzle; a body with a water-cooling chamber therein; and means defining a passageway with a circular opening for a shielding gas; said nozzle, body, chamber, and opening, being arranged concentrically about said electrode; said body being formed of permanently assembled pieces and having therein an axial channel surrounded by said cooling chamber said nozzle being in said channel and having a diameter smaller than said channel. Said body at one end, having a seat for the nozzle; said opening for the shielding gas being disposed around the front end of said axial channel; said torch further comprising means for releasably closing the rear of said channel thereby permitting extraction and insertion of the interchangeable nozzle through the rear of said channel; means for holding and clamping the electrode within said axial channel; and means for urging said nozzle against said seat so as to insure intimate contact between the nozzle and the seat for good thermal conductance between the nozzle and said body.

2. A torch according to claim 1, wherein the means for holding and clamping the electrode, and the means for urging the nozzle, form a unit arranged in said axial channel, said unit being introduceable into said channel from the rear end thereof; and screw means provided, said screw means being provided for securing said unit to said body.

3. A torch for working with a constricted electric arc comprising: a torch body; means defining an axial channel in said torch body; an electrode of refractory material; means for releasably clamping said electrode within said axial channel in an appropriate relationship with the fore end of said body; means in said torch body defining a water cooling chamber extending concentrically with said electrode; seating means at the fore end of said torch body, said seating means being adapted to be cooled by said cooling chamber; an interchangeable nozzle slidably mounted in said axial channel concentrically with said electrode; abutting means for urging said nozzle against said seating means for intimate, heat conducting, contact therewith upon assembly; cap means for releasably closing the aft end of said axial channel, so that when said cap means is released, said abuting means is likewise released, and said nozzle may be extracted and replaced.

4. The torch of claim 3 wherein said body has further means therein defining an annular chamber adapted to convey a shielding gas through the fore end of said body.

5. The torch of claim 3 wherein said means for releasably clamping said electrode within said axial channel, and said abutting means form a unit adapted to slide in said axial channel, being introduceable therein from the rear thereof.

6. The torch of claim 4 wherein screw means are provided at the aft end of said channel for securing said unit to said body.

References Cited

UNITED STATES PATENTS

| 2,898,441 | 8/1959 | Reed et al. | 219—75 |
| 2,922,024 | 1/1960 | Cresswell | 219—75 |
| 3,030,490 | 4/1962 | Reed | 219—75 |
| 3,121,784 | 2/1964 | McGinty et al. | 219—75 |
| 3,125,667 | 3/1964 | Oyler | 219—75 |

JOSEPH V. TRUHE, Primary Examiner

L. A. ROUSE, Assistant Examiner